US 6,601,035 B1

(12) United States Patent
Panagos et al.

(10) Patent No.: US 6,601,035 B1
(45) Date of Patent: Jul. 29, 2003

(54) METHODS FOR DYNAMICALLY PREDICTING WORKFLOW COMPLETION TIMES AND WORKFLOW ESCALATIONS

(75) Inventors: Euthimios Panagos, New Providence, NJ (US); Michael Rabinovich, Gillette, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/891,012

(22) Filed: Jul. 10, 1997

(51) Int. Cl.[7] .............................................. G06F 17/00
(52) U.S. Cl. ............................ 705/8; 700/100; 709/104
(58) Field of Search ..................... 364/468.01, 468.03, 364/468.05–468.1; 705/7–9, 11; 700/100; 709/104

(56) References Cited

U.S. PATENT DOCUMENTS

| | | | |
|---|---|---|---|
| 5,233,533 A | * | 8/1993 | Edstrom et al. ............ 705/8 X |
| 5,548,506 A | * | 8/1996 | Srinivasan ......... 364/468.01 X |
| 5,893,905 A | * | 4/1999 | Main et al. .................... 705/11 |
| 5,907,490 A | * | 5/1999 | Oliver ................... 364/468.05 |

FOREIGN PATENT DOCUMENTS

WO    WO 94/16393    * 7/1994

OTHER PUBLICATIONS

Shane, "How to Keep a Project on Schedule", Machine Design, v. 49, n. 7, p. 68–70.*
Claris, MacProjectll, User's Guide, Chpts 1,4, 1989.*
Sobiesk et al., "Over–Constrained Scheduling Using Dynamic Programming" Proc. AI and Manufacturing Research Workshop, AAAI, Jun. 1996.*
Panagos et al., "Escalations in Workflow Management Systems" DART Workshop, Nov. 1996, pp. 1–5.*
Panagos et al., "Predictive Workflow Management", Next Generation Information Technologies and Systems, 1997, pp. 1–5.*

* cited by examiner

Primary Examiner—M. Kemper

(57) ABSTRACT

A work flow management system (WFMS) can execute one or more instances of a workflow process. The execution of each workflow process is comprised of the execution of component activities. More particularly, dynamically predicting deadlines of a workflow process, whether a workflow process will escalate and whether it is beneficial to preemptively escalate a workflow process.

28 Claims, 6 Drawing Sheets

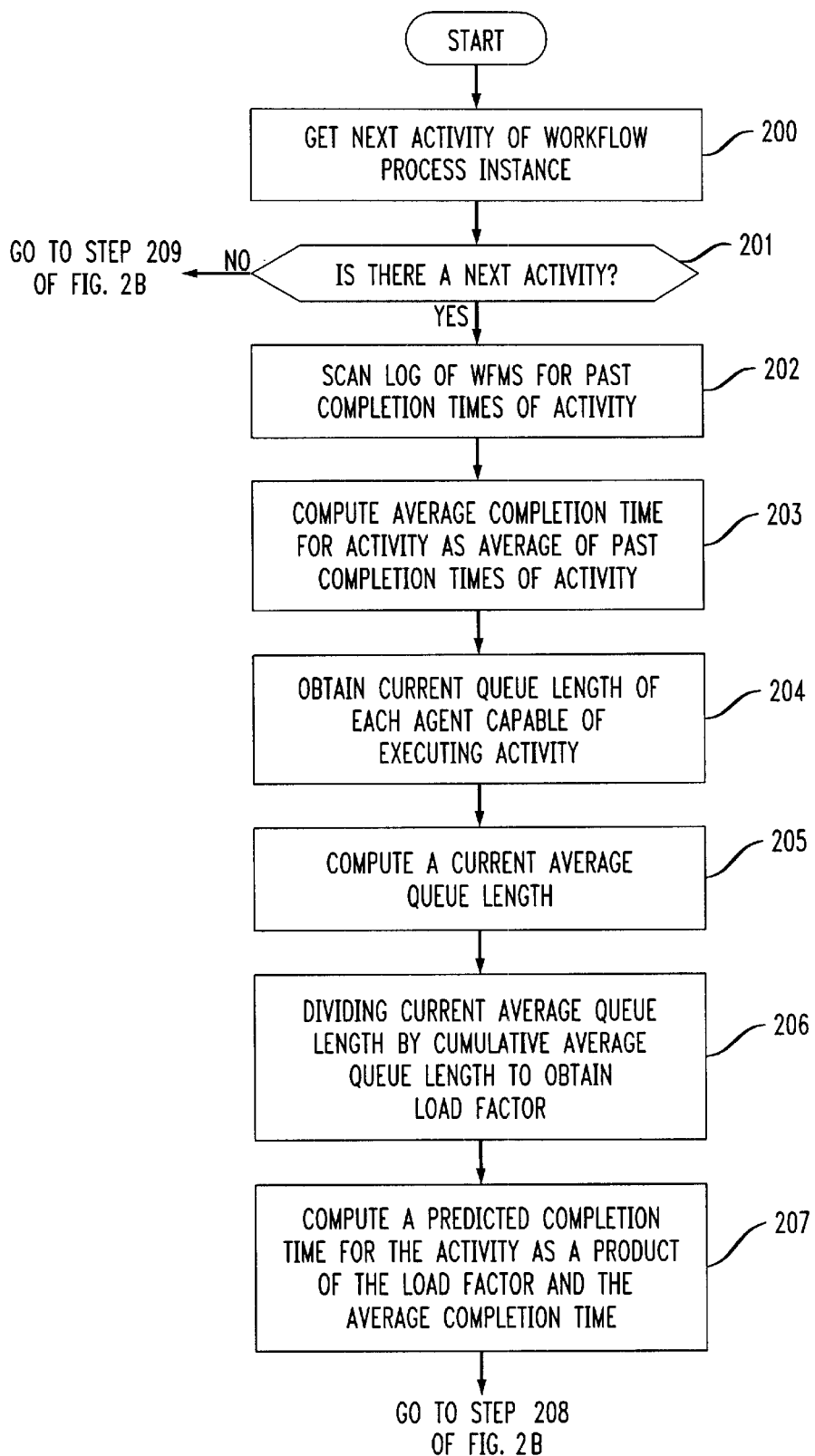

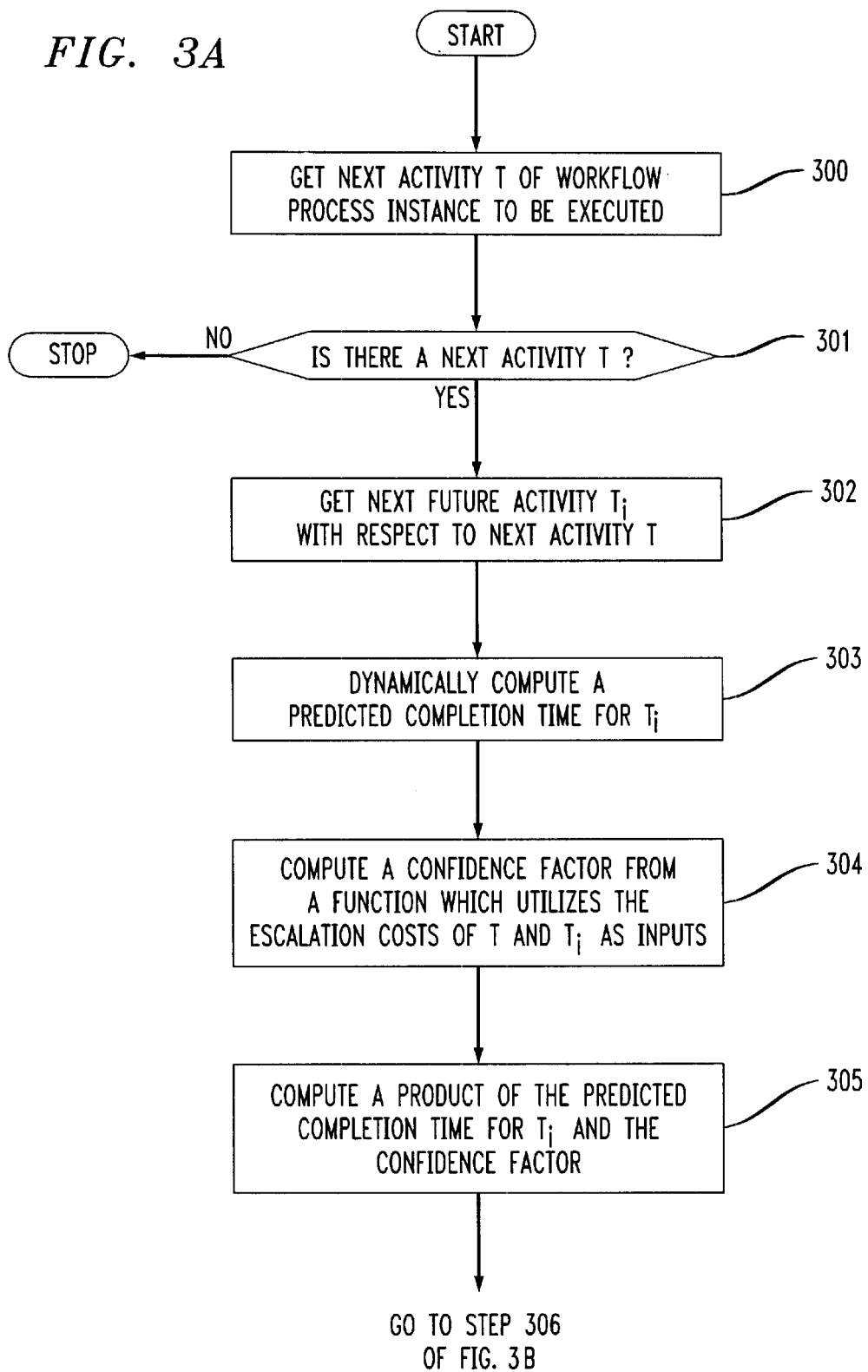

METHODS FOR DYNAMICALLY PREDICTING WORKFLOW COMPLETION TIMES AND WORKFLOW ESCALATIONS

TECHNICAL FIELD OF THE INVENTION

The present invention relates to dynamic predictions for workflow systems. More particularly, the present invention relates to dynamically predicting: deadlines of a workflow process, whether a workflow process will escalate and whether it is beneficial to preemptively escalate a workflow process.

BACKGROUND OF THE INVENTION

Organizations use workflow management systems (WFMSs) to streamline, automate, and manage business processes that depend on information systems and human resources. Examples of such business processes would include provisioning of telephone services, processing insurance claims and handling bank loan applications.

A workflow is an abstraction of a business process. It consists of activities, which correspond to individual process steps, and agents, which execute these activities. An agent may be an information system (e.g., a database system), a human (e.g., a customer representative at his or her workstation) or a combination of both (e.g., a human using a software program at his or her workstation).

The workflow specification may also specify allowable execution times, referred to as deadlines for the purposes of this patent, for both the individual component activities as well as for the entire business process being modeled. A deadline is defined as the time by which an activity, or the whole workflow process, must complete in order to avoid special actions known as escalations. A deadline is typically determined by first calculating a predicted completion time and then adding a certain amount of slack time. Completion time is the time it takes a particular activity to complete from the time the activity is first submitted to an agent's queue for execution. Typically, escalations increase the cost of business processes due to the execution of additional activities, the compensation of finished activities, or the intervention of highly-paid workers.

WFMSs provide tools to: support the modeling of business processes at a conceptual level, coordinate the execution of the component activities according to the model, monitor the execution progress, and report various statistics about the business processes and the resources involved in their enactment.

According to the Workflow Management Coalition (WFMC) reference model in the WFMC Specification, shown in FIG. 1 a WFMS consists of an engine 100, application agents 104–106, invoked applications 107–109, a process definition.tool 101, and administration and monitoring tool's 102. The WFMC Specification, by the WFMC Group, document number WFMC-TC-1011, is incorporated herein by reference. Typically, the process definition tool 101 is a visual editor which is used to define the specification, i.e., the schema, of a workflow process. The same schema can be used for creating multiple instances of the same business process at a later time. The workflow engine 100, the tools 101–102, the application agents 104–106, and the invoked applications 107–109 communicate with a workflow database 103 to store and update workflow-relevant data, such as workflow schemas, statistical information, and control information required to execute and monitor the active process instances.

The schema specifies the activities that constitute the workflow and precedence relationships among them. Precedence relationships determine the execution sequence (or path) of the activities as well as the data flow between them. Activities can be executed sequentially or in parallel. Parallel executions may be unconditional, i.e., all activities are executed, or conditional, i.e., only activities that satisfy a condition are executed. In addition, activities may be executed repeatedly and the number of iterations may be determined by data obtained during execution of the process instance.

Some common activities are: (i) ordering an item, (ii) ordering a service, (iii) canceling an item and (iv) canceling a service. For the purposes of this patent, these four preceding activities will be referred to as commodity requests. A commodity request is typically output by the workflow management system in order that an external system or organization can satisfy the request. Another activity may be causing a signal to be routed to a data processing system.

WFMSs known in the art allow for the specification of deadlines for the component workflow activities as well as for the entire workflow process. However, the assignment of deadlines is done statically for all instances of the same workflow process, and it is based on the worst-case scenario for the load level of the agents involved in the workflow process. The schema may specify escalations which are executed when the process or some of its activities miss their deadlines.

Known WFMSs maintain audit logs that keep track of information about the status of workflow processes, and various statistics about past process executions. This information can be used to provide real-time status reports about the state of the system and the active workflow process instances, as well as various statistical measurements such as the average completion time of an activity belonging to the particular process schema.

It would be desirable to utilize the status and statistical information in WFMSs to dynamically predict the timing properties of workflow executions, and to use these dynamic predictions to manage workflows better.

SUMMARY OF THE INVENTION

It is therefore an object of the present invention to dynamically assign the deadline of an activity from the dynamic calculation of a predicted completion time.

The dynamic calculation of a predicted completion time relies upon the dynamic calculation of an average completion time and of a load factor. The average completion time of an activity is an average of the past actual completion times of that activity. The load factor of an activity is a ratio of average current queue length and the cumulative average queue length. The average current queue length is the average of the current queue lengths of all the agents that can execute the activity, while the cumulative average queue length is also computed with respect to these same agents. For each activity, its average completion time and load factor are typically calculated as of the time the workflow process is submitted for execution.

Another object of the present invention is the calculation of a deadline for the entire workflow process by summing the deadlines for each activity along the critical path.

A further object of the present invention is the prediction of an escalation, during the execution of a workflow instance, when a current activity is about to be executed, by looking ahead to a future activity which has not yet been executed and dynamically computing its predicted completion time. If the predicted completion time of the future activity is greater than the activity's deadline, an escalation is predicted.

It is a further object of the present invention to determine whether it is beneficial to preemptively escalate, given that a future activity is predicted to escalate, by calculating a confidence factor by which the predicted completion time is multiplied. If the product is still greater than the activity's deadline, then it is beneficial to preemptively escalate. The confidence factor is based upon the escalation costs of the current activity and the future activity.

BRIEF DESCRIPTION OF THE DRAWINGS

The above and other objects of the present invention will be apparent upon consideration of the following detailed description, taken in conjunction with the accompanying drawings, in which like reference, characters refer to like parts throughout, and in which:

FIGS. 2A–2C depict a method for dynamically computing the deadlines of a workflow process instance in accordance with the present invention; and FIGS. 3A–3B depict a method for dynamically detecting a beneficial preemptive escalation while executing a workflow process instance in accordance with the present invention.

DETAILED DESCRIPTION OF THE INVENTION

As a specific example to motivate the need for dynamic workflow predictions, consider the telephone service provisioning workflow in a telecommunications company. As known in the art, a business analyst statically decides the maximum completion time for all instances of the provisioning workflow based on the worst-case scenario for the load level of the agents and other resources involved in the execution of this workflow. In terms of existing WFMSs, this translates into a static assignment of deadlines during schema specification.

Therefore, when a customer orders a service, under workflows according to the known art, the customer representative cites this worst-case completion time as the deadline. However, if the customer called during a quiet period, when the system is not busy, under a workflow according to the present invention, the company can obtain a competitive advantage by dynamically predicting (and therefore promising to the customer) a shorter deadline.

Conversely, the system may be swamped with service orders due to, for example, a better than expected response to a promotion or new service offering. In this case, under a workflow according to the present invention, the company can dynamically predict (and therefore promise the customer) a longer deadline. Clearly, it is desirable to promise a longer deadline than to give an unrealistic promise that will almost certainly result in an escalation.

The dynamic prediction of completion times is accomplished by examining, when the process is submitted for execution, the current state of the system (load, resource availability, etc.) and using the statistics collected during the past executions of instances having the same schema. Then, deadlines can be assigned to both the process instance and its component activities using the predicted completion times. Different techniques can be used to predict the completion times varying in accuracy and the amount of information they require. The following is a particular method of dynamically calculating predicted completion times.

Figure 1:
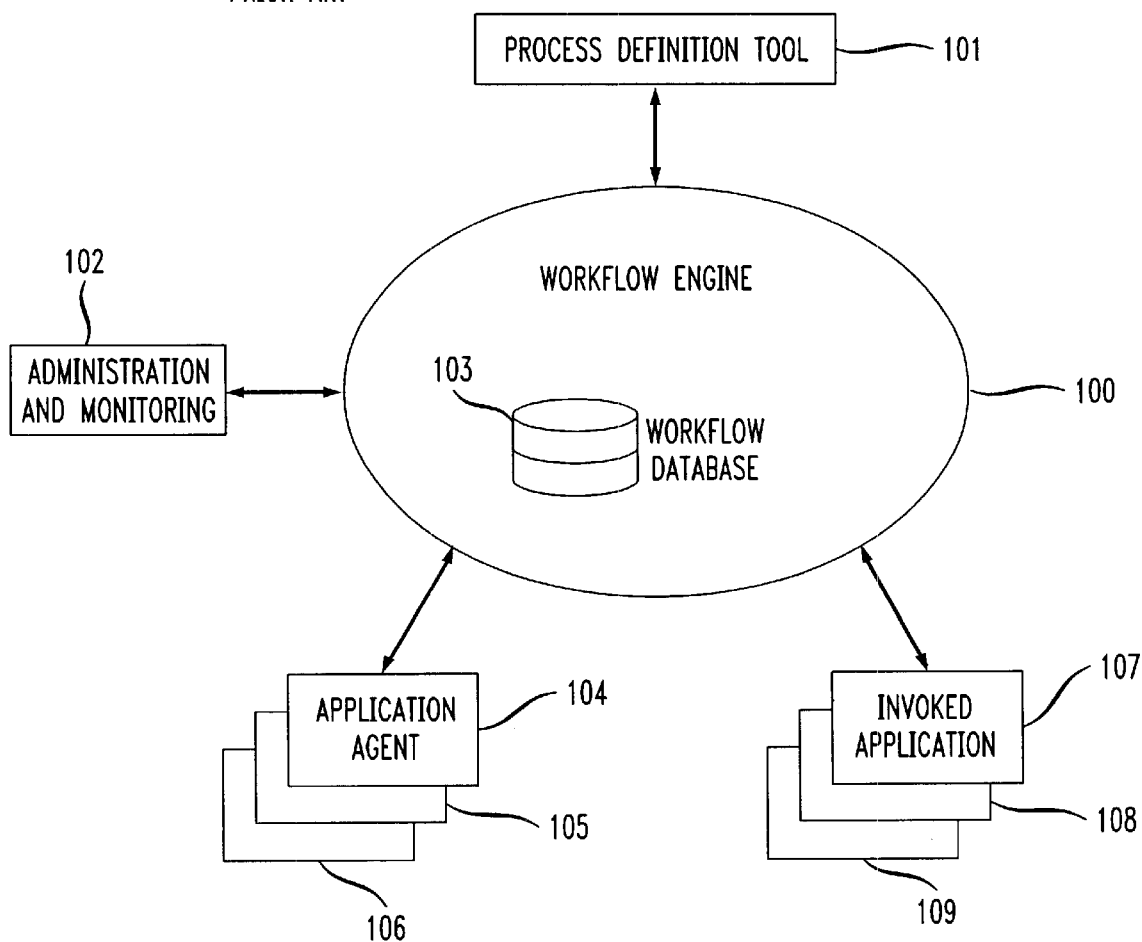
FIG. 1 is an illustrative schematic diagram that depicts the WFMC reference model for a WFMS.
Figure 2B:
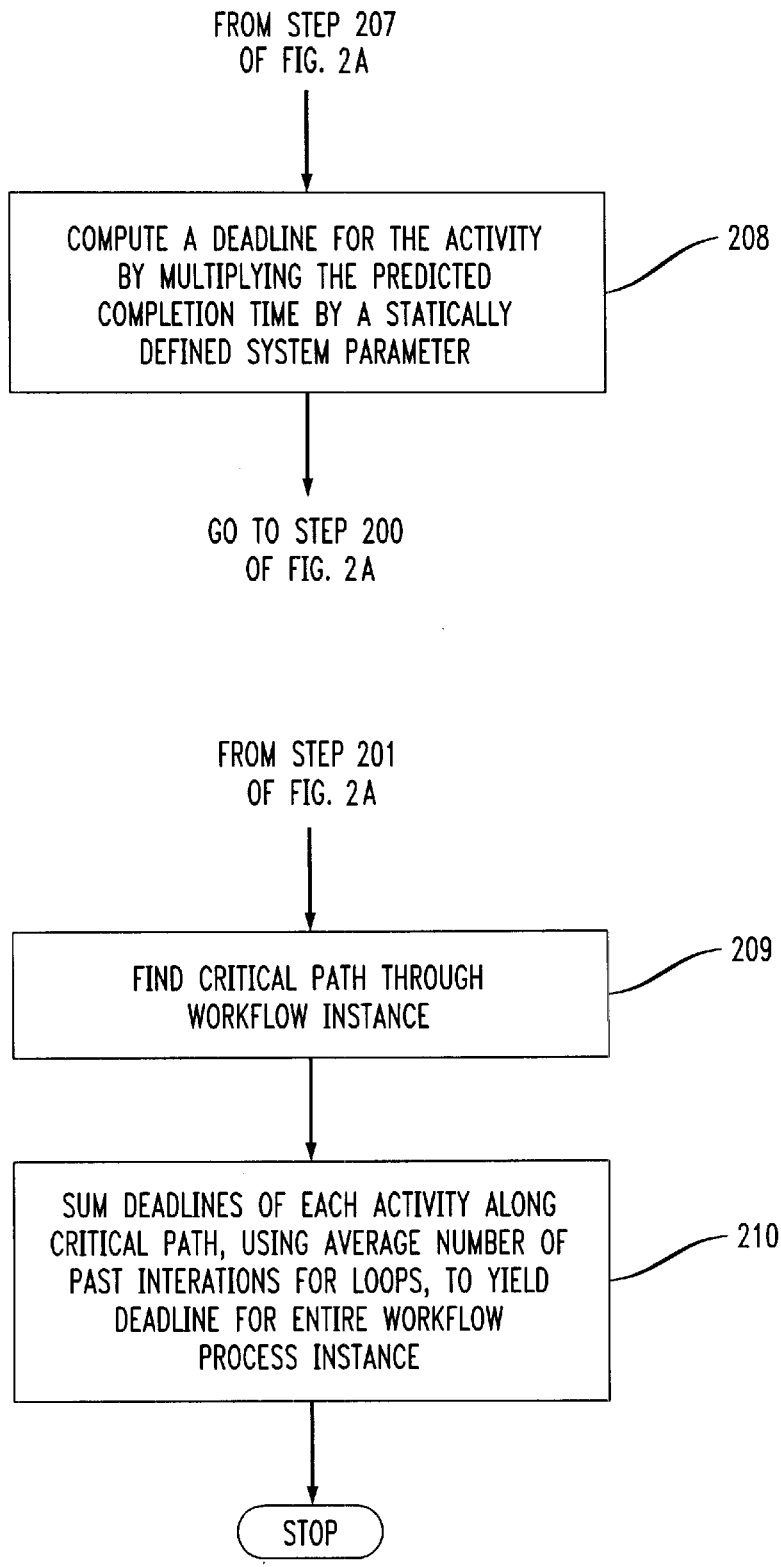

This method is depicted in FIGS. 2A–2B. Let W be a workflow instance containing distinct activities $T_1, \ldots, T_m$, and avg_completion $(T_i)$ be an estimate of the average completion time for $T_i$. This estimate is an average of the past completion times of $T_i$. Such past completion times can be extracted from the audit logs maintained by known WFMSs. avg_completion($T_i$) corresponds to the average time taken by the agent that will execute $T_i$ to complete $T_i$, after $T_i$ is submitted for execution, and it includes any queuing time at the agent's work queue. The average completion time of an activity is the average of the actual completion times of that activity in the past executions of workflow processes containing that activity. Assigning deadlines to the entire process and to each of its individual activities consists of the following steps.

1. For each $T_i$, let its predicted completion time, pred_completion $(T_i)$, be $a_{T_i}$ * avg_completion $(T_i)$, where $a_{T_i}$ is the load factor that depends on the current load of the system. The iteration through each activity $T_i$ is accomplished by steps 200–201 of FIG. 2A, while the calculation of avg_completion $(T_i)$ is performed by steps 202–203. Alternatively, steps 202–203 need not be executed every time the dynamic predicted completion time algorithm is invoked. The, WFMS log can be scanned periodically, in an off-line fashion, and the average completion time of activities computed. These average completion times can be used until the next scan is performed. One way $a_{T_i}$ can be calculated is as the following ratio:

$$\frac{\text{cur\_queue}(T_i)}{\text{avg\_queue}(T_i)}$$

where cur_queue $(T_i)$ is the average of the current queue lengths of all the agents that can execute $T_i$, and avg_queue $(T_i)$ is the cumulative average queue length of these agents. This calculation of $a_{T_i}$ is performed by steps 204–206 of FIG. 2A. This ratio is based upon the intuitive observation that, for example, if the cumulative average queue length of all agents that can execute $T_i$ is 3 and the current average queue length of these agents is 6, we should expect that $T_i$ will take twice as long, provided that the current load conditions remain the same by the time $T_i$ becomes ready for execution. The calculation of pred_completion $(T_i)$ from $a_{T_i}$ and avg_completion $(T_i)$ is accomplished by step 207 of FIG. 2A.

2. For every activity $T_i$, let deadline $(T_i)$=s* pred_completion $(T_i)$, where s>1 is a statically defined system parameter that adds some slack to the predicted completion time. This calculation is accomplished by step 208 of FIG. 2B.

Figure 2C:
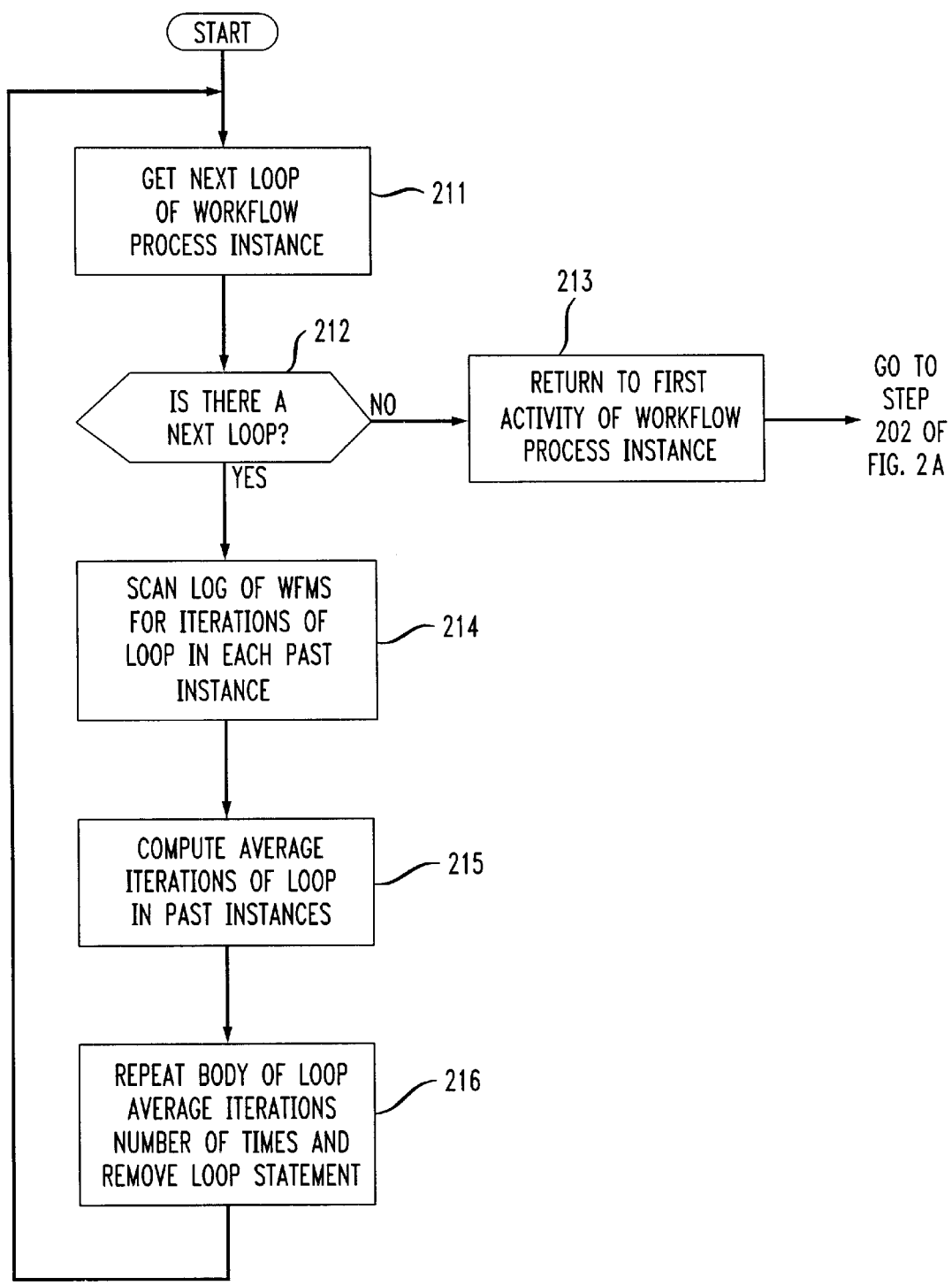

3. Find the critical path in the workflow using the above computed deadlines. When the workflow schema contains loops, unroll them. One way of unrolling the loops is to assume that the current schema instance will execute its loops according to the average number of loop iterations that occurred in past executions of other instances of the same workflow. This unrolling of loops is typically accomplished as a preprocessing step before this four-step procedure for dynamically assigning deadlines is begun. This preprocessing is depicted as steps 211–216 of FIG. 2C.

4. Use the time of the critical path as the overall process deadline, and each deadline ($T_i$) as the deadline for an individual activity $T_i$ (recall that this time has some slack built into it). The time of the critical path is calculated by summing the deadline ($T_i$) for each of its activities. The critical path, and its time is calculated by steps 209–210 of FIG. 2B.

This procedure assumes that the WFMS keeps statistics about the average number of loop iterations in the past process executions for each workflow schema.

In addition, in the case where conditional executions are part of the workflow schema, the above algorithm always takes into account the longest branch. Using statistics about the frequency of past branch executions can result in a more accurate prediction where conditional execution is part of the workflow schema. For instance, if branch A takes a month (a new cable must be installed to provision the order), compared to a couple of days taken by branch B, but A happens only 1% of the time, we may want to use a shorter branch in our calculations, even though the critical path goes through branch A. The process definition tool must allow the business analyst to specify the branches that have to be taken into account in performing the critical path evaluation thereby allowing the analyst's semantic knowledge about the process to be utilized.

When workflow activities take longer to finish than their deadlines allow, escalations may take place. Escalations can have either local or global scope. Local escalations affect the triggering activity (i.e., the one that triggered the escalation), and they may: (a) restart the triggering activity, (b) execute a new activity and resume the triggering activity, or (c) replace the triggering activity with a new activity. Global escalations affect the whole business process, and they may: (a) abort the whole business process and compensate all finished activities, or (b) stop the normal flow of execution, compensate some of the finished activities, and execute an alternative sequence of activities to complete the process. Compensation is the execution of an activity to reverse the effect of a previously executed activity.

In all cases, escalations increase the cost of business processes and, thus, it is desirable to reduce their occurrences. Alas, escalations cannot be always avoided e.g., when resources required for the enactment of an activity are not available for an extended time period, or when the system is heavily loaded.

In accordance with the present invention, it is possible to dynamically predict whether active workflow process instances will escalate based upon current conditions at the agents that will be executing some of the activities of the workflow process instance in the future. Once an escalation has been predicted, the present invention contains functions for determining whether it is beneficial to preemptively escalate during the execution of an earlier activity when the workflow process has not yet actually missed a deadline. For example, workflow processes may be redirected along an alternative execution path which may include a workstation for performance of at least one manual operation.

Preemptive escalation leaves more time to remedy the situation, which often translates into an escalation whose activities incur reduced operational costs. For example, if execution of an escalation activity requires shipment of a package, then an allowance of greater time for delivery may permit use of a less costly carrier. In addition, in many cases an escalation involves rolling back finished activities and, hence, invoking it early entails fewer wasted resources. More specifically, rolling back encompasses either aborting an activity in progress or executing compensating activities.

Several considerations must be weighed in deciding upon the number of future activities to consider in predicting a future escalation. The greater the number of future activities which are examined for escalation prediction, the earlier a future escalation can be predicted. Predicting an escalation earlier means that, generally, greater benefits can be obtained from preemptively escalating. Earlier predictions of escalation have the disadvantage of being less accurate and of thereby increasing the probability of performing needless preemptive escalations. However, the greater the cost of a future escalation with respect to a preemptive escalation, the less confident we have to be in predicting escalation to justify escalating preemptively.

Figure 3B:
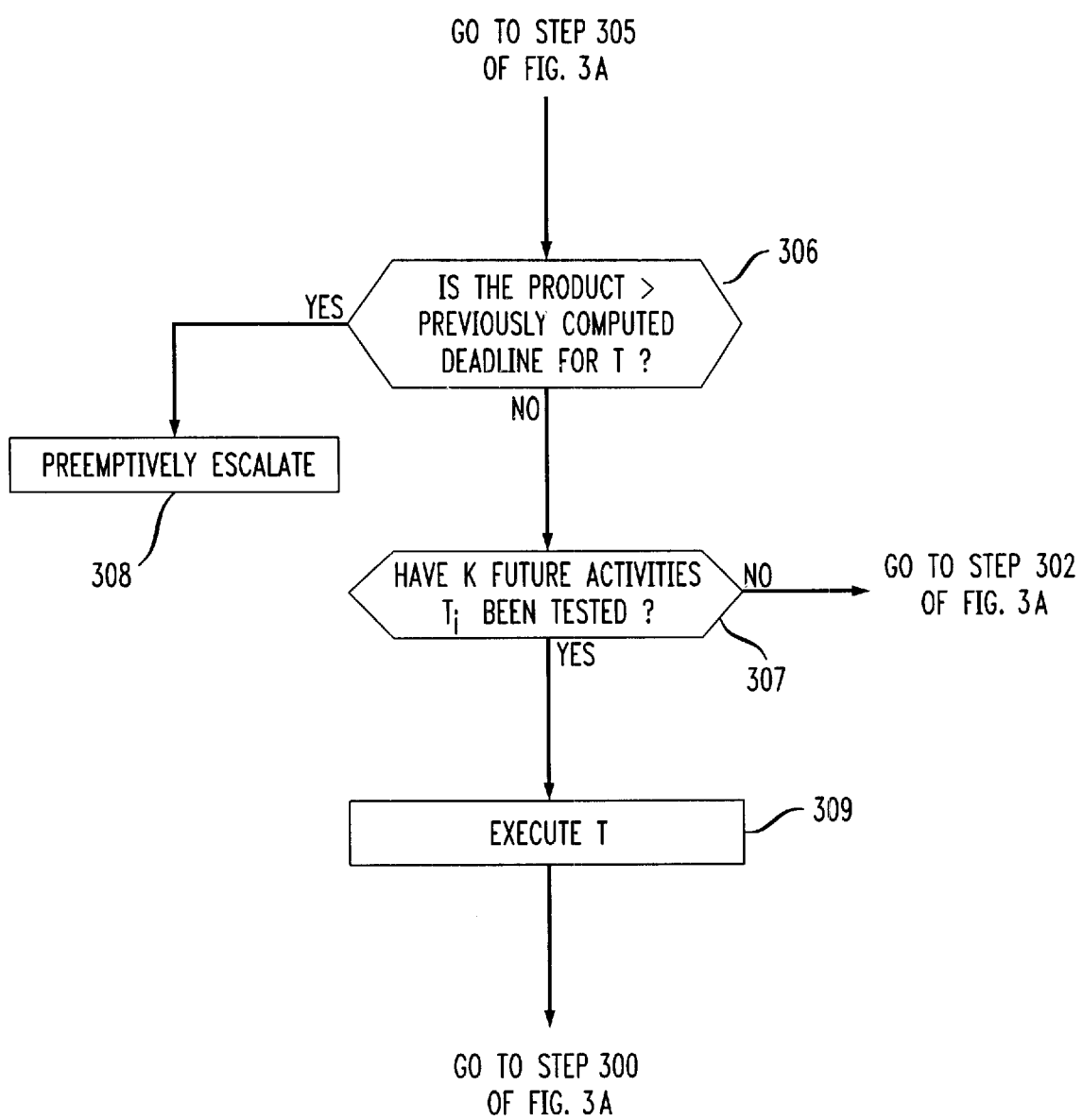

In the following, illustrated by FIGS. 3A–3B, we assume that the business analyst estimates, for each activity $T_i$, the cost of escalation when it is invoked during $T_i$'s execution, denoted escal_cost ($T_i$) below. If we examine k future activities to determine whether preemptive escalation is beneficial, the following algorithm can be used.

1. Let T be the activity to be executed next, and $T_1 \ldots T_k$ be the future k activities we are going to examine. The stepping through of successive activities T is accomplished by steps 300–301 of FIG. 3A. For each activity T, the examination of k future activities is accomplished by steps 302 and 307.

2. If there exists $T_i$ such that deadline ($T_i$)<pred_completion ($T_i$), where pred_completion ($T_i$) is dynamically calculated as of the point in time when T is about to be executed using the same algorithm as described previously for dynamically assigning deadlines, then an escalation is predicted for activity $T_i$. The dynamic calculation off pred_completion ($T_i$) is accomplished by step 303 of FIG. 3A. A preemptive, escalation of T is beneficial with respect to the later predicted escalation of $T_i$ if:

$$\text{confidence\_factor}(T, T_i) * \text{pred\_completion}(T_i) > \text{deadline}(T_i)$$

$$\text{Where confidence\_factor}(T, T_i), = 1 - \frac{\text{escal\_cost}(T)}{\text{escal\_cost}(T_i)}$$

For the purposes of this patent we introduce a term which we call a confidence factor, or confidence_factor (T, $T_i$), which reflects the idea that the less the predicted completion time of $T_i$ exceeds the deadline for $T_i$, the more we need additional information in order to be sure that preemptive escalation is cost effective. For example, if pred_completion ($T_i$) exceeds deadline ($T_i$) slightly, then even a small error in estimating pred_completion ($T_i$) can lead to the incorrect prediction that $T_i$ will escalate. However, if the escalation costs of T and $T_i$ are close, confidence factor (T, $T_i$) will be a small fraction or negative and will therefore prevent a possibly unnecessary escalation that, in any case, is of little benefit. However, if the escalation cost of $T_i$ greatly exceeds that of T, confidence_factor (T, $T_i$) will be close to one and we will escalate preemptively to avoid the possibility of a much more expensive escalation occurring later. The computation of the confidence factor is accomplished by step 304 of FIG. 3A. The computation of a product of the confidence factor and the dynamically calculated predicted completion time is performed by step 305 of FIG. 3A. Step 306 tests whether the product is greater than a previously computed deadline for $T_i$ and causes a preemptive escalation to occur at step 308 if this condition is satisfied. This escalation can be either global or local as described previously. If k future activities have already been examined for possible escalation, as tested for by step 307, then step 309 will finally allow T to be executed. After step 309, the process repeats with the next activity of the workflow process instance being T at step 300.

The above algorithm will work fine as long as the activities we examine are executed unconditionally. However, when some of these activities are executed conditionally, then an activity with high escalation cost that is executed rarely will force us to escalate preemptively all the time. An example of a high escalation cost, rarely executed, activity was discussed above with respect to deadline prediction where conditional executions are part of the workflow schema.

This problem can be rectified in several ways. First, we can limit the scope of our prediction, k, to the next closest branching point in the workflow schema. Second, we can invoke escalation preemptively only if it is beneficial for all alternative activities. This, however, introduces the following problem: a rarely executed alternative activity, which does not warrant escalation, will always block preemptive escalations. As a middle ground between preemptive escalation when it is beneficial for any one of the alternative activities and doing so only if it is beneficial for all alternative activities, we can use conditional probabilities of activity executions. These probabilities can be extracted from the audit log that records the history of past executions. In particular, if frequency ($T_i$) is the frequency of execution of a conditional activity $T_i$ given the preceding branching point is reached, we can modify the last inequality of the above algorithm as follows:

$$\text{confidence\_factor } (T, T_i) \text{ pred\_completion}(T_i) > \text{deadline}(T_i)$$

where:

$$\text{confidence\_factor}(T, T_i) = 1 - \frac{\text{escal\_cost}(T)}{\text{frequency}(T_i) * \text{escal\_cost}(T_i)} *$$

and where $$\text{frequency}(T_i) \text{ is} > 0 \text{ and} \leq 1$$

Persons skilled in the art will appreciate that the present invention may be practiced by other than the described embodiments, which are presented for purposes of illustration and not of limitation, and the present invention is limited only by the claims which follow.

We claim:

1. A method of controlling a workflow process to maximize workflow efficiency, comprising the steps of:
   examining the current state of the workflow management system when the process is executed by measuring activities of an agent;
   computing by a processor a load factor for a first activity;
   multiplying the load factor by an average completion time for the first activity to produce a predicted completion time;
   determining a deadline for the first activity from the predicted completion time;
   executing the workflow process according to a first execution path wherein all the agents are data processing systems;
   if a completion time of the first activity is greater than the deadline of the first activity, then redirecting the workflow process along an alternate execution path which includes a workstation for performance of at least one manual operation; and
   controlling activities of the agent based on a calculated dynamic prediction of completion times to manage the workflow management system for responding to a commodity request.

2. The method of claim 1, further comprising the step of:
   multiplying the predicted completion time by a statically defined slack factor to produce a deadline for the first activity.

3. The method of claim 1, further comprising the steps of:
   scanning a log of the workflow management system for at least one past completion time of a first activity; and
   computing an average of the at least one past completion time to produce an average completion time.

4. The method of claim 1, further comprising the steps of:
   scanning a queue of at least one agent that can execute a first activity to determine at least one current queue length;
   computing an average of the at least one current queue length to determine a current average queue length; and
   dividing the current average queue length by a cumulative average queue length of at least one agent that can execute the first activity to produce a load factor.

5. A method for managing a first process in a workflow management system to maximize workflow, comprising the steps of:
   examining the current state of the workflow management system when the process is executed by measuring activities of an agent;
   executing by a processor the first process according to a first execution path wherein all the agents are data processing systems;
   when the first process is about to execute a first activity, selecting a future activity to be executed after the first activity;
   computing by a processor a current predicted completion time of the future activity from a state of the workflow management system as it is about to execute the first activity;
   multiplying the current predicted completion time by a confidence factor to produce a scaled current predicted completion time;
   preemptively escalating, if the scaled current predicted completion time is greater than a previously computed deadline for the future activity, wherein the escalation comprises redirecting the workflow process along an alternate execution path which includes a workstation for performance of at least one manual operation; and
   controlling activities of the agent based on a calculated dynamic prediction of completion times to manage the workflow management system for responding to a commodity request.

6. The method according to claim 5, further comprising the step of calculating the confidence factor from a function taking as inputs an escalation cost of the first activity and an escalation cost of the future activity.

7. A method of controlling a workflow process to maximize workflow efficiency, comprising the steps of:
   examining the current state of the workflow management system when the process is executed by measuring activities of an agent;
   computing by a processor a load factor for a first activity;
   multiplying the load factor by an average completion time for the first activity to produce a predicted completion time;
   determining a deadline for the first activity from the predicted completion time;

executing the workflow process according to a first execution path which includes a first workstation for performing a first manual operation;

if a completion time of the first activity is greater than the deadline of the first activity, then redirecting the workflow process along an alternate execution path which includes a second workstation for performing a second manual operation different from the first manual operation; and controlling activities of the agent based on a calculated dynamic prediction of completion times to manage the workflow management system for responding to a commodity request.

8. The method of claim 7, further comprising the step of:

multiplying the predicted completion time by a statically defined slack factor to produce a deadline for the first activity.

9. The method of claim 7, further comprising the steps of:

scanning a log of the workflow management system for at least one past completion time of a first activity; and computing an average of the at least one past completion time to produce an average completion time.

10. The method of claim 7, further comprising the steps of:

scanning a queue of at least one agent that can execute a first activity to determine at least one current queue length;

computing an average of the at least one current queue length to determine a current average queue length; and dividing the current average queue length by a cumulative average queue length of at least one agent that can execute the first activity to produce a load factor.

11. A method for managing a first process in a workflow management system to maximize workflow efficiency, comprising the steps of:

examining the current state of the workflow management system when the process is executed by measuring activities of an agent;

executing by a processor the first process according to a first execution path which includes a first workstation for performing a first manual operation;

when the first process is about to execute a first activity, selecting a future activity to be executed after the first activity;

computing by a processor a current predicted completion time of the future activity from a state of the workflow management system as it is about to execute the first activity;

multiplying the current predicted completion time by a confidence factor to produce a scaled current predicted completion time;

preemptively escalating, if the scaled current predicted completion time is greater than a previously computed deadline for the future activity, wherein the escalation comprises redirecting the workflow process along an alternate execution path which includes a second workstation for performing a second manual operation different from the first manual operation; and controlling activities of the agent based on a calculated dynamic prediction of completion times to manage the workflow management system for responding to a commodity request.

12. The method according to claim 11, further comprising the step of calculating the confidence factor from a function taking as inputs an escalation cost of the first activity and an escalation cost of the future activity.

13. A method for managing a workflow process in a workflow management system to maximize workflow efficiency, comprising the steps of:

examining the current state of the workflow management system when the process is executed by measuring activities of an agent;

computing by a processor a load factor for a first activity;

multiplying the load factor by an average completion time for the first activity to produce a predicted completion time;

determining a deadline for the first activity from the predicted completion time;

executing the workflow process according to a first execution path; and if a completion time of the first activity is greater than the deadline of the first activity, then redirecting the workflow process along an alternate execution path wherein the alternate execution path causes a commodity request to be output by the workflow management system; and controlling activities of the agent based on a calculated dynamic prediction of completion times to manage the workflow management system for responding to a commodity request.

14. The method of claim 13, further comprising the step of:

multiplying the predicted completion time by a statically defined slack factor to produce a deadline for the first activity.

15. The method of claim 13, further comprising the steps of:

scanning a log of the workflow management system for at least one past completion time of a first activity; and computing an average of the at least one past completion time to produce an average completion time.

16. The method of claim 13, further comprising the steps of:

scanning a queue of at least one agent that can execute a first activity to determine at least one current queue length;

computing an average of the at least one current queue length to determine a current average queue length; and dividing the current average queue length by a cumulative average queue length of at least one agent that can execute the first activity to produce a load factor.

17. A method for managing a first process in a workflow management system to maximize workflow efficiency, comprising the steps of:

examining the current state of the workflow management system when the process is executed by measuring activities of an agent;

executing by a processor the first process according to a first execution path;

when the first process is about to execute a first activity, selecting a future activity to be executed after the first activity;

computing by a processor a current predicted completion time of the future activity from a state of the workflow management system as it is about to execute the first activity;

multiplying the current predicted completion time by a confidence factor to produce a scaled current predicted completion time;

preemptively escalating, if the scaled current predicted completion time is greater than a previously computed deadline for the future activity, wherein the escalation comprises redirecting the workflow process along an alternate execution path wherein the alternate execution path causes a commodity request to be output by the workflow management system; and controlling activities of the agent based on a calculated dynamic prediction of completion times to manage the workflow management system for responding to a commodity request.

18. The method according to claim 17, further comprising the step of calculating the confidence factor from a function taking as inputs an escalation cost of the first activity and an escalation cost of the future activity.

19. A method of controlling a workflow process to maximize workflow efficiency, comprising the steps of:

examining the current state of the workflow management system when the process is executed by measuring activities of an agent;

computing by a processor a load factor for a first activity;

multiplying the load factor by an average completion time for the first activity to produce a predicted completion time;

determining a deadline for the first activity from the predicted completion time;

executing the workflow process according to a first execution path;

if a completion time of the first activity is greater than the deadline of the first activity, then redirecting the workflow process along an alternate execution path wherein the alternate execution path causes a signal to be routed to a data processing system; and controlling activities of the agent based on a calculated dynamic prediction of completion times to manage the workflow management system for responding to a commodity request.

20. The method of claim 19, further comprising the step of:

multiplying the predicted completion time by a statically defined slack factor to produce a deadline for the first activity.

21. The method of claim 19, further comprising the steps of:

scanning a log of the workflow management system for at least one past completion time of a first activity; and computing an average of the at least one past completion time to produce an average completion time.

22. The method of claim 19, further comprising the steps of:

scanning a queue of at least one agent that can execute a first activity to determine at least one current queue length;

computing an average of the at least one current queue length to determine a current average queue length; and dividing the current average queue length by a cumulative average queue length of at least one agent that can execute the first activity to produce a load factor.

23. A method of controlling a workflow process to maximize workflow efficiency, comprising the steps of:

examining the current state of the workflow management system when the process is executed by measuring activities of an agent;

executing by a processor the first process according to a first execution path;

when the first process is about to execute a first activity, selecting a future activity to be executed after the first activity;

computing by a processor a current predicted completion time of the future activity from a state of the workflow management system as it is about to execute the first activity;

multiplying the current predicted completion time by a confidence factor to produce a scaled current predicted completion time;

preemptively escalating, if the scaled current predicted completion time is greater than a previously computed deadline for the future activity, wherein the escalation comprises redirecting the workflow process along an alternate execution path wherein the alternate execution path causes a signal to be routed to a data processing system; and controlling activities of the agent based on a calculated dynamic prediction of completion times to manage the workflow management system for responding to a commodity request.

24. The method according to claim 23, further comprising the step of calculating the confidence factor from a function taking as inputs an escalation cost of the first activity and an escalation cost of the future activity.

25. A method of controlling a workflow process to maximize workflow efficiency, comprising the steps of:

examining the current state of the workflow management system when the process is executed by measuring activities of an agent;

computing by a processor a load factor for a first activity;

multiplying the load factor by an average completion time for the first activity to produce a predicted completion time;

determining a deadline for the first activity from the predicted completion time;

sending the deadline to the user; and controlling activities of the agent based on a calculated dynamic prediction of completion times to manage the workflow management system for responding to a commodity request.

26. The method of claim 25, further comprising the step of:

multiplying the predicted completion time by a statically defined slack factor to produce a deadline for the first activity.

27. The method of claim 25, further comprising the steps of:

scanning a log of the workflow management system for at least one past completion time of a first activity; and computing an average of the at least one past completion time to produce an average completion time.

28. The method of claim 25, further comprising the steps of:

scanning a queue of at least one agent that can execute a first activity to determine at least one current queue length;

computing an average of the at least one current queue length to determine a current average queue length; and dividing the current average queue length by accumulative average queue length of at least one agent that can execute the first activity to produce a load factor.

* * * * *